United States Patent [19]

Isayama et al.

[11] 4,050,078

[45] Sept. 20, 1977

[54] AUTOMATIC NOZZLE CLEANING SYSTEM FOR INK EJECTION PRINTER

[75] Inventors: Takuro Isayama; Kikuo Kubo, both of Tokyo, Japan

[73] Assignee: Ricoh Company, Ltd., Tokyo, Japan

[21] Appl. No.: 638,136

[22] Filed: Dec. 5, 1975

[30] Foreign Application Priority Data

Dec. 9, 1974 Japan ............................... 49-141760

[51] Int. Cl.$^2$ ............................................ G01D 18/00

[52] U.S. Cl. ................................................ 346/140 R

[58] Field of Search ................................ 346/140, 75

[56] References Cited

U.S. PATENT DOCUMENTS

| | | | |
|---|---|---|---|
| 3,596,275 | 7/1971 | Sweet | 346/75 X |
| 3,761,953 | 9/1973 | Helgeson et al. | 346/75 |
| 3,769,630 | 10/1973 | Hill et al. | 346/75 |
| 3,893,126 | 7/1975 | Ascoli et al. | 346/75 X |

*Primary Examiner*—Joseph W. Hartary
*Attorney, Agent, or Firm*—Frank J. Jordan

[57] ABSTRACT

An ink ejection nozzle acts as one electrode and is arranged to eject ink against another electrode during an ink ejection test of the nozzle. The ink stream electrically connects the electrodes when the ink is being ejected normally, whereby the ink flow rate is analogous to the electrical impedance or capacitance between the electrodes. If the nozzle is clogged with an ink deposit so that the flow rate is insufficient, the system ejects a solvent through the nozzle to dissolve the deposit. The flow rate of the solvent is also sensed and the solvent ejection is terminated when the solvent flow rate is sufficient. Ink is then again ejected to purge the solvent from the nozzle.

9 Claims, 4 Drawing Figures

Fig. 3

| CONDITION | FLUID IMPEDANCE RT | ELECTRODE VOLTAGE ET | COM 1 | COM 2 | LOGICALLY HIGH OUTPUT SIGNALS |
|---|---|---|---|---|---|
| INK AND/OR SOL-VENT FLOW SUBNORMAL | $RT \geq R_5$ | $ET \geq E2$ | 0 | 0 | INKNGO SOLNGO |
| INK FLOW NORMAL | $R_5 > RT \geq R_1$ | $E2 > ET \geq E1$ | 0 | 1 | INKGO |
| SOLVENT FLOW NORMAL | $R_3 > RT$ | $E1 > ET$ | 1 | 1 | SOLGO |

AUTOMATIC NOZZLE CLEANING SYSTEM FOR INK EJECTION PRINTER

The present invention relates to an automatic nozzle cleaning system for an ink ejection printer of the type used in teletype communications, computer systems, facsimile reproduction systems and the like.

In an ink ejection printer, a nozzle is moved in a controlled manner relative to a sheet of paper and ink is ejected from the nozzle in such a manner as to form required characters or the like on the paper. A problem has been encountered in such systems in that the ink tends to coagulate in the nozzle to clog the same. This is almost unavoidable since the end of the nozzle is open to the air, and air causes the ink to dry. Prior art attempts to overcome this problem include an automatically actuated cap to cover the end of the nozzle and a nozzle configuration whereby the ink is recessed from the end of the nozzle due to capillary action when the printer is not being used. Both of these provisions fail to prevent clogging of the nozzle due to coagulation of the ink.

It is therefore an object of the present invention to provide an automatic nozzle cleaning system for an ink ejection printer which overcomes the drawbacks of the prior art.

It is another object of the present invention to provide an automatic nozzle cleaning system for an ink ejection printer which senses the ink flow rate through the nozzle and ejects solvent through the nozzle to dissolve the coagulated ink when the sensed flow rate is below a predetermined value.

The above and other objects, features and advantages of the present invention will become clear from the following detailed description taken with the accompanying drawings, in which:

FIG. 3 is a logic chart for the nozzle cleaning system; and

Figure 1:
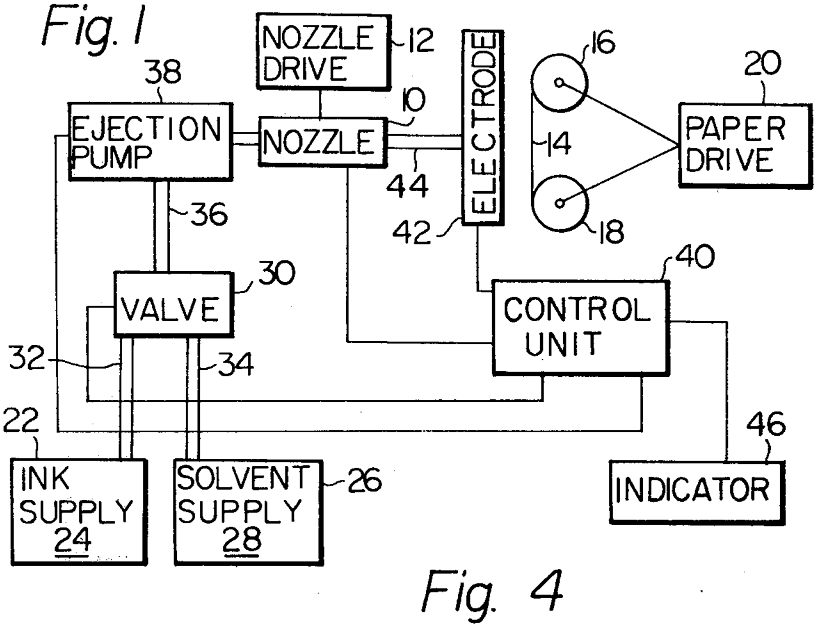
FIG. 1 is a block diagram of an ink ejection system for a printer incorporating an automatic nozzle cleaning system embodying the present invention.

Referring now to FIG. 1, an ink ejection printer (no numeral) comprises an ink ejection nozzle 10 which is movable by a nozzle drive 12. The nozzle 10 is adapted to eject ink onto paper 14 in the form of a roll which is would around rollers 16 and 18, the rollers 16 and 18 being driven by a paper drive 20. In operation, the nozzle 10 and paper 14 are driven and ink is fed to the nozzle 10 in such a manner that desired characters or the like are formed on the paper 14. Such an ink ejection printer is known in the art and is not part of the present invention per se.

An ink supply container 22 is provided to contain ink 24, and a solvent supply container 26 is provided to contain a solvent 28. The solvent 28 comprises water or a lower alcohol if the ink 24 is water soluble or may be petroleum-based if the ink 24 is oleaginous. The ink 24 and solvent 28 may be of any composition as long as the ink 24 is soluble in the solvent 28.

The ink 24 from the container 22 is fed to a valve 30 through a capillary tube 32 and the solvent 28 from the container 26 is fed to the valve 30 through a capillary tube 34. The valve 30 serves to connect one or the other of the capillary tubes 32 and 34 to a capillary tube 36, which leads to an ejection pump 38 which, when actuated, feeds the ink 24 or the solvent 28 through the ejection nozzle 10. The nozzle 10 comprises at least one section which is in contact with the ink 24 or the solvent 28 passing therethrough and is electrically connected to a control unit 40. An electrode 42 which is typically in the form of a plate is movable by the control unit 40 from a normal position which is spaced from a fluid stream 44 (the fluid may be either the ink 24 or the solvent 28) ejected from the nozzle 10 to a test position as shown in which it intercepts the fluid stream 44. The electrode 42 is also electrically connected to the control unit 40, which is further connected to control the valve 30 and ejection pump 38. Since the present invention is not concerned with the normal operation of the ink ejection printer, further description of the paper 14 and paper and nozzle drives 20 and 12 respectively will be omitted and it will be understood that the electrode 42 is in the test position to intercept the fluid stream 44 as shown.

In operation, the control unit 40 controls the valve 30 to connect the ejection pump 38 to the ink supply 22 through the capillary tubes 32 and 36 and actuates the ejection pump 38 to feed the ink 24 through the nozzle 10 to impinge against the electrode 42. If the nozzle 10 is not clogged with the ink 24, the fluid stream 44 will be normal and the nozzle 10 will be electrically connected to the electrode 42 by the fluid stream 44 which is constituted by the ink 24. Specifically, since the ink 24 has finite resistivity, the electrical impedance between the nozzle 10 and electrode 42 will be finite when the fluid stream 44 is normal and have a certain value which is sensed by the control unit 40. In this case, the control unit 40 will simply deactuate the system in preparation for a printing operation. The control unit 40 may be arranged to sense any flow parameter of the fluid stream 44 such as the flow rate, electrical impedance or electrical capacitance between the nozzle 10 and electrode 42.

If the nozzle 10 is partially or completely clogged, the electrical impedance between the nozzle 10 and the electrode 42 will be higher than the normal value. In the extreme case where the nozzle 10 is completely clogged and there is no fluid stream 44, the electrical impedance between the nozzle 10 and the electrode 42 will be infinite.

If the electrical impedance between the nozzle 10 and electrode 42 is above a first predetermined value which is higher than the normal value, the control unit 40 will control the valve 30 to connect the capillary tube 34 to the capillary tube 36 so that the solvent 28 is fed to the nozzle 10 by the ejection pump 38. The solvent 28 will dissolve the coagulated ink 24 in the nozzle 10 so that nozzle 10 will become cleaned and thereby unclogged. The solvent 28 also has a finite resistivity so that the flow of solvent 28 can be measured in the same manner as the ink 24. When the electrical impedance between the nozzle 10 and the electrode 42 exceeds a second predetermined value, which is typically lower than the first predetermined value, due to the fluid stream 44 (which is now composed of solvent 28) connecting the nozzle 10 to the electrode 42, the control unit 40 actuates the valve 30 to re-connect the capillary tube 32 to the capillary tube 36 to again eject the ink 24 through the nozzle 10. Although the nozzle 10 has been cleaned by the solvent 28, the valve 30, capillary tube 36, ejection pump 38 and nozzle 10 are still filled with the solvent 28. For this reason, the control unit 40 again senses the electrical impedance between the nozzle 10 and electrode 42. As the flow of the ink 24 purges the solvent 28 from the nozzle 10, etc., the electrical impedance between the nozzle 10 and the electrode 42 will increase until it exceeds the first predetermined value indicating that the nozzle 10 has been purged of the solvent 28. The system is then de-actuated in preparation for a printing operation. In case the nozzle 10 is so clogged that it cannot be cleaned by the solvent 28 after a predetermined period of time has elapsed, the system is de-actuated and the control unit 40 energizes an indicator 46 such as a light or buzzer to indicate to the operator that the nozzle 10 must be manually cleaned or replaced.

Figure 2:
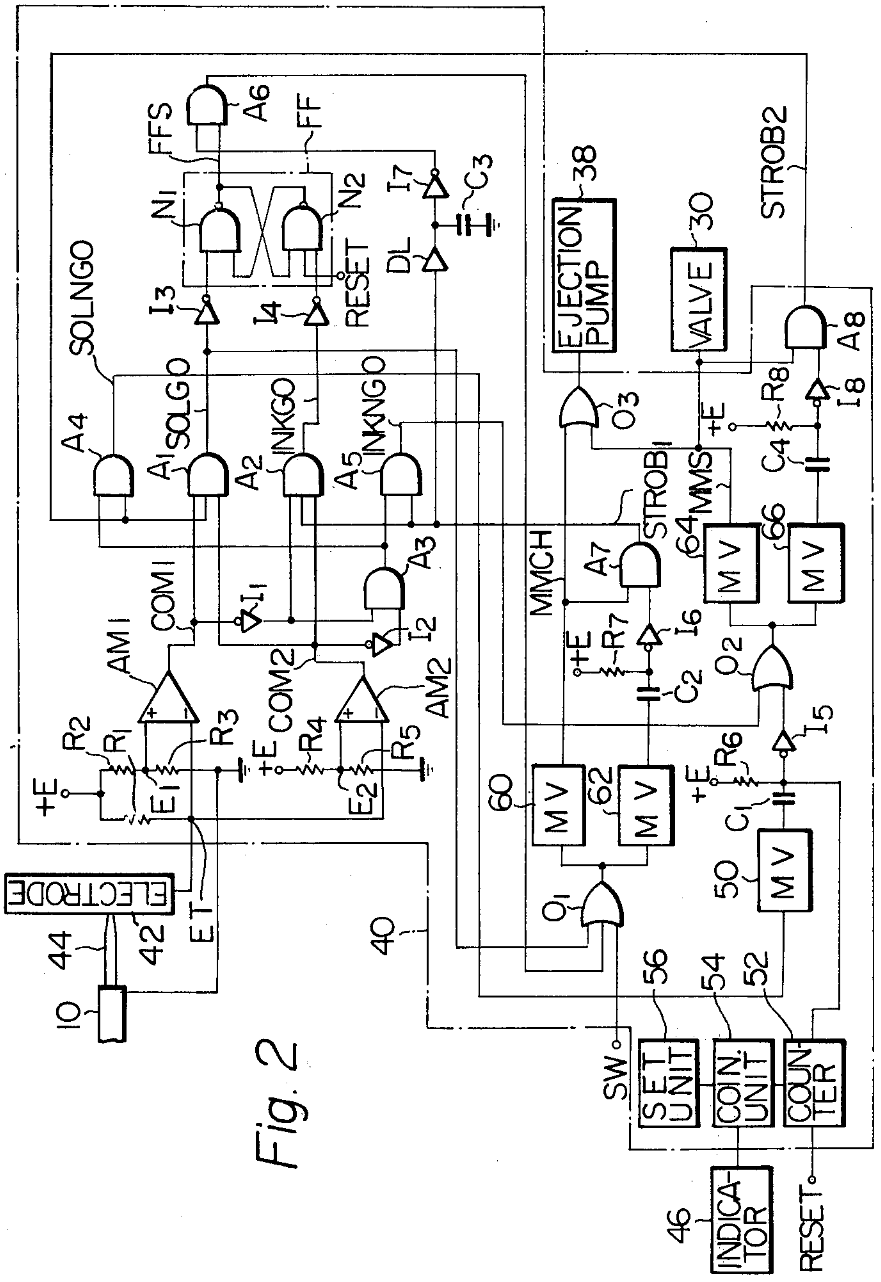
FIG. 2 is a detailed schematic diagram of the automatic nozzle cleaning system shown in FIG. 1.

Referring now to FIG. 2, the control unit 40 is shown in detail. The portion of the nozzle 10 which serves as the electrode is grounded, and the electrode 42 is connected to a positive DC voltage source +E through a resistor R1. The junction between the electrode 42 and resistor R1 is also connected to inverting (negative) inputs of operational amplifiers AM1 and AM2 which function as voltage comparators. Resistors R2 and R3 are connected between th source +E and ground with the junction therebetween connected to the non-inverting (positive) input of the operational amplifier AM1 to apply a predetermined first bias or comparison voltage E1 thereto. Resistors R4 and R5 are connected between the source +E and ground with the junction therebetween connected to the non-inverting input of the operational amplifier AM2 to apply a second predetermined bias or comparison voltage E2 thereto. The magnitude of the second bias voltage E2 is greater than the magnitude of the first bias voltage E1.

The output of the operational amplifier AM1 is connected directly to an input of an AND gate A1, and through an inverter I1 to inputs of AND gates A2 and A3. The output of the operational amplifier AM2 is connected directly to inputs of the AND gates A1 and A2 and through an inverter I2 to an input of the AND gate A3. The output of the AND gate A3 is connected to inputs of AND gates A4 and A5. The output of the AND gate A1 is connected through an inverter I3 to an input of a NAND gate N1, and the output of the AND gate A2 is connected through an inverter I4 to an input of a NAND gate N2.

The NAND gates N1 and N2 are connected to constitute a flip-flop FF. Specifically, the output of the NAND gate N1 is connected to an input of the NAND gate N2 and the output of the NAND gate N2 is connected to an input of the NAND gate N1. The output of the NAND gate N1 is connected to an input of an AND gate A6. The output of the inverter I3 constitutes a set of input for the flip-flop FF and the output of the inverter I4 constitutes a reset input for the flip-flop FF. The NAND gate N2 is further adapted to receive a RESET signal as will be described below.

The output of the AND gate A6 is connected to an input of an OR gate O1, and the output of the AND gate A1 is connected to another input of the OR gate O1. The OR gate O1 further has an input connected to receive a trigger signal SW from a manual switch or the like which is not shown.

The output of the AND gate A4 is connected to an input of a monostable multivibrator 50. The output of the AND gate A5 is connected to an input of an OR gate 02. The output of the multivibrator 50 is connected through a capacitor C1 and an inverter I5 to another input of the OR gate O2. The junction between the capacitor C1 and inverter I5 is connected to the source +E through a resistor R6. The resistor R6 and capacitor C1 constitute a differentiating circuit to differentiate the output of the multivibrator 50. Said junction is further connected to a count input of a counter 52, the output of which is applied to a coincidence unit 54. The counter 52 is arranged to be reset by the RESET signal. The coincidence unit 54 also receives the output of a set unit 56 as will be described in detail below. The output of the coincidence unit 54 is connected to the indicator 46. The output of the OR gate O1 is connected to inputs of monostable multivibrators 60 and 62, with the period of the multivibrator 60 being longer than that of the multivibrator 62. The output of the multivibrator 60 is connected to an input of an OR gate O3 and also to an input of an AND gate A7. The output of the multivibrator 62 is connected through a capacitor C2 and an inverter I6 to another input of the AND gate A7. The input of the inverter I6 is connected to the source +E through a resistor R7 in such a manner that the resistor R7 and capacitor C2 serve as a differentiating circuit for the output of the multivibrator 62. The output of the AND gate A7 is connected to inputs of the AND gates A2 and A5. The output of the AND gate A7 is further connected through a delay element DL and an inverter I7 to an input of the AND gate A6. A capacitor C3 is connected between the output of the delay element DL and ground. The output of the OR gate O3 is connected to control the ejection pump 38.

The output of the OR gate O2 is connected to inputs of monostable multivibrators 64 and 66, with the period of the multivibrator 64 being longer than that of the multivibrator 66. The output of the multivibrator 64 is connected to an input of the OR gate O3, and is also connected to control the valve 30. The output of the multivibrator 64 is further connected to an input of an AND gate A8, the output of which is connected to inputs of the AND gates A1 and A4. The output of the multivibrator 66 is connected through a capacitor C4 and an inverter I8 to an input of the AND gate A8. A resistor R8 is connected between the input of the inverter I8 and the source +E so that the capacitor C4 and the resistor R8 serve to differentiate the output of the multivibrator 66.

Figure 4:
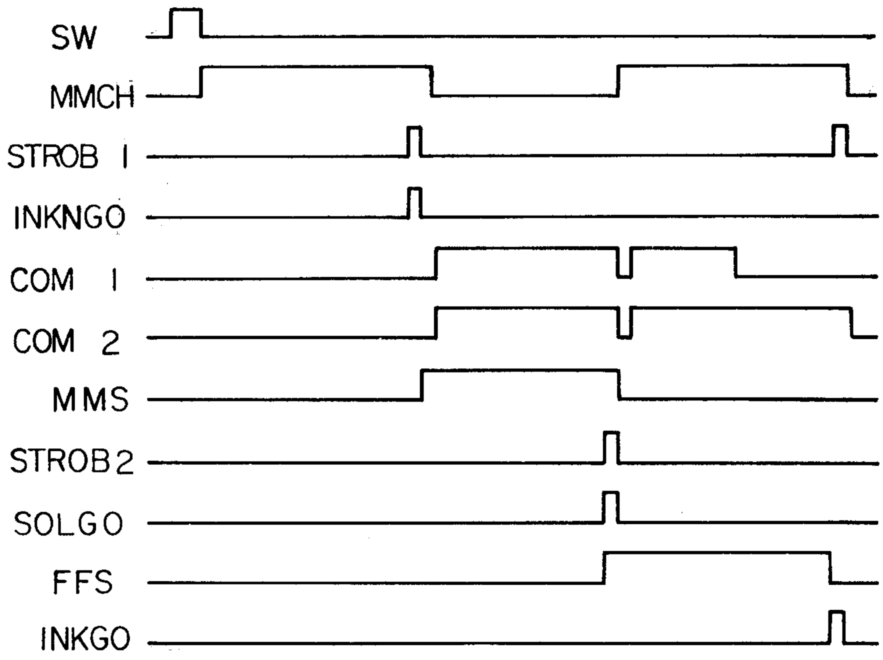
FIG. 4 is a timing diagram of electrical signals used in the nozzle cleaning system.

Referring also to FIG. 4, the output of the operational amplifier AM1 is designated as a first comparison signal COM1, and the output of the operational amplifier AM2 is designated as a second comparison signal COM2. The output of the AND gate A2 is designated as a normal ink flow signal INKGO, and is logically high (1) or positive when the ink 24 flow is normal. The output of the AND gate A5 is designated as INKNGO, and indicates, when logically high, that the ink 24 flow is subnormal or that the nozzle 10 is clogged. The output of the AND gate A1 is designated as SOLGO, and indicates normal solvent 28 flow. The output of the AND gate A4 is designated as SOLNGO, and indicates subnormal solvent flow. The operational amplifiers AM1 and AM2, and the AND gates A1 to A5 along with their associated circuitry constitute an integral ink 24 and solvent 28 flow sensor means (no numeral).

The output of the NAND gate N1 is designated as FFS, and indicates, when logically high, that the solvent 28 has successfully purged the clogged ink 24 from the nozzle 10 but some residual solvent 28 remains in the nozzle 10 as will be described in detail below. The RESET signal is generated either when the power is applied to the system, by a namual switch (not shown), or automatically. It will be assumed in the subsequent description of the operation of the system that the RESET signal has been applied.

The signal SW is generated either automatically or by a manual switch to initiate the testing and cleaning operation as will be described below. The output of the multivibrator 60 is used to energize the ejection pump 38 for an ink 24 flow testing operation, and is designated as MMCH. A signal STROB1 is derived from the signal MMCH, which serves as an ink 24 flow gating or strobe signal. The output of the multivibrator 64 is designated as MMS and is used to energize the ejection pump 38 and change over the valve 30 during a solvent 28 cleaning operation. A signal STROB2 is derived from the signal MMS and serves as a solvent 28 flow gating or strobe signal.

The operation of the ink 24 and solvent 28 flow sensing means will now be described with reference to FIGS. 2 and 3.

It will be noticed that the portion of the nozzle 10 serving as the electrode is grounded, so that the voltage on the electrode 42 will have some value designated as ET relative to ground which is dependent on the impedance RT of the fluid stream 44. If the fluid stream 44 is not existent (the nozzle 10 is completely clogged), RT will be infinite and the value of ET will be equal to +E.

The bias voltage E1 is associated with solvent 28 flow. When the fluid stream 44 is constituted by the solvent 28 and the solvent 28 flow rate is normal, the impedance RT of the fluid stream 44 will have a value which is less than a value R3 at which the voltage ET is equal to the bias voltage E1.

The bias voltage E2 is associated with ink 24 flow. When the fluid stream 44 is constituted by the ink 24 and the ink 24 flow is normal, the impedance RT of the fluid stream 44 will be greater than R3 and less than a value R5 at which the voltage ET is equal to the bias voltage E2. It will be recalled that the ink 24 has greater resistivity than the solvent 28, so that the voltage ET will be greater for normal ink 24 flow than for normal solvent 28 flow.

When the impedance RT of the fluid stream 44 is above R5 and the voltage ET is above E2, it is considered that the nozzle 10 is clogged so that neigher the solvent 28 nor the ink 24 can flow therethrough in a normal manner.

When the solvent 28 flow is normal, the voltage ET at the inverting input terminal of the operational amplifier AM1 will be lower than the bias voltage E1 at the non-inverting input terminal thereof, so that the operational amplifier AM1 will produce a logically high or 1 output as the signal COM1. Since the voltage ET is also lower than the bias voltage E2, the operational amplifier AM2 will also produce a 1 output as the signal COM2. During a period when the signal STROB2 is present, the AND gate A1 will produce a high or 1 output signal SOLGO.

When the ink 24 flow is normal, the operational amplifier AM2 will continue to produce a high output since the voltage ET is lower than the voltage E2. However, since the voltage ET is higher than the voltage E1, the operational amplifier AM1 will invert the input signal and produce a low or 0 output. When the signal STROB1 is present, the AND gate A2 will produce a high output signal INKGO.

When the nozzle 10 is clogged so that the ink 24 flow is subnormal, the voltage ET will be greater than E2 so that both of the operational amplifiers AM1 and AM2 will produce low outputs. The AND gate A5 will produce a high output signal INKNGO in response to the signal STROB1. If the nozzle 10 is so clogged that the solvent flow is subnormal, the AND gate A4 will produce a high output signal SOLNGO in response to the signal STROB2. The AND gates A1 to A5 will be seen to constitute a decoder (no numeral).

To initiate the test operation, the operator presses a switch or the like to generate the signal SW, which is shown in the timing diagram of FIG. 4. This signal SW is gated through the OR gate 01 to trigger the multivibrators 60 and 62. The multivibrator 60 generates the signal MMCH which energizes the ejection pump 38 to pump the ink 24 through the ejection nozzle 10 against the electrode 42. The output signal of the multivibrator 62 is differentiated by the resistor R7 and capacitor C2 so that the leading (rising) edge thereof produces a positive spike (not shown). This is inverted by the inverter I6 to produce a negative spike which has no effect on the AND gate A7, which produces a low output to inhibit and AND gates A2 and A5. The AND gate A8 also produces a low output to inhibit the AND gates A1 and A4.

As mentioned above, the period of the multivibrator 62 is shorter than that of the multivibrator 60. The trailing (falling) edge of the output signal of the multivibrator 62 is differentiated to produce a negative spike (not shown), which is inverted by the inverter I6 and gated through the AND gate A7 to produce the gating signal STROB1 to enable the AND gates A2 and A5. If the ink 24 flow is normal, the AND gate A2 will produce a high output signal INKGO to reset the flip-flop FF and de-actuate the system prior to a printing operation. If the nozzle 10 is clogged, the AND gate A5 will produce a pulse signal INKNGO as shown in FIG. 4 which is applied through the OR gate O2 to the multivibrators 64 and 66 to trigger the same. It will be noted that during the period of the signal MMCH, the outputs COM1 and COM2 of the operational amplifiers AM1 and AM2 are both low as described with reference to FIG. 3.

The signal INKNGO triggers the multivibrator 64 which produces the signal MMS. The signal MMS energizes the ejection pump 38 and actuates the valve 30 so that the ejection pump 38 pumps the solvent 28 through the nozzle 10 against the electrode 42. Assuming that the nozzle 10 is only slightly clogged, the ink 24 deposit will be quickly dissolved by the solvent 28 so that the voltage ET will quickly drop below the voltage E1 and both operational amplifiers AM1 and AM2 will produce high output signals COM1 and COM2. The output of the multivibrator 66 is differentiated in the same manner as the output of the multivibrator 62 to produce the gating signal STROB2, which enables the AND gates A1 and A4. The AND gate A1 will then produce a high output signal SOLGO which sets the flip-flop FF to produce a high signal FFS and triggers the multivibrators 60 and 62. The signal MMCH is produced as above by the multivibrator 60 to eject the ink 24 through the nozzle 10. However, since the nozzle 10 and associated components are filled with the solvent 28, the operational amplifier AM1 will continue to produce a high output signal COM1 until the ink 24 purges the solvent 28 from the nozzle 10 to the extent that the proportion of the ink 24 in the nozzle 10 is great enough that the impedance of the fluid stream 44 will exceed R3 and the voltage ET will exceed E1. The signal COM1 then becomes low while the signal COM2 remains high so that the AND gate A2 produces a high INKGO signal in response to the signal STROB1 from the AND gate A7. This INKGO signal resets the flip-flop FF and the test and cleaning operation is terminated.

It is also possible that the nozzle 10 is clogged to the extent that one application of the solvent 28 is not sufficient to clean it. In this case both operational amplifiers AM1 and AM2 will continue to produce low outputs COM1 and COM2 so that the AND gate A4 produces a high output signal SOLNGO in response to the signal STROB2. This signal SOLNGO triggers the multivibrator 50, the differentiated output of which is applied to the counter 52 and to the multivibrators 64 and 66 through the OR gate O2. The signals MMS and STROB2 are thereby generated to produce another solvent ejection operation. If this operation is successful in cleaning the nozzle 10, the AND gate A1 will produce the signal SOLGO which will cause the ink 24 to be ejected as described above.

The system operator or maintenance personnel decides a predetermined number of solvent 28 ejection operations after which the nozzle 10 is considered as being hopelessly clogged if it is not successfully cleaned by the solvent 28 ejection. This number is set manually into the set unit 56. If a solvent 28 ejection operation occurs more than once (the AND gate A4 produces at last one SOLNGE signal), the differentiated output of the multivibrator 50 increments the counter 52. If the count in the counter 52 becomes equal to the number in the set unit 56, the coincidence unit 54 produces an output which actuates the indicator 46 to alert the operator to either clean the nozzle 10 manually or replace it. The RESET signal is generated either manually or automatically after each test and cleaning operation to reset the counter 52 and flip-flop FF.

After a solvent cleaning operation is successful (a SOLGO signal is produced), the ink 24 is again fed to the nozzle 10 as described above. If, however, the capillary tube 36 is long, one ink 24 ejection operation may not be sufficient to purge all of the solvent 24 from the tube 36, nozzle 10 and associated components. In this case, since the impedance RT of the fluid flow 44 is maintained below the value R3 by the presence of residual solvent 28 in the ink 24, the operational amplifiers AM1 and AM2 will continue to produce high output signals COM1 and COM2. In response to the signal STROB1, neither of the AND gates A2 nor A5 will produce a high output signal. However, the signal STROB1 is delayed by the delay unit DL and applied to the AND gate A6 through the inverter 17. The output of the AND gate A6 becomes high, and is applied through the OR gate O1 to produce another ink 24 ejection operation. This is repeated until a sufficient amount of the solvent 28 is purged from the nozzle 10, etc. at which time the AND gate A2 will produce a high output signal INKGO to reset the flip-flop FF and terminate the testing and cleaning operation of the system.

Many modifications and additions are possible for those skilled in the art without departing from the scope of the present disclosure. For example, an ultrasonic oscillating element may be disposed to agitate either or both of the ink 24 and solvent 28 and the flow of the ink 24 and solvent 28 may of course be measured by any known means.

What is claimed is:

1. Ink ejecting apparatus comprising:

a first electrode;

ejection nozzle means comprising a second electrode and being arranged to eject ink and solvent against the first electrode;

ink supply means for feeding ink to the ejection nozzle means;

solvent supply means for feeding a solvent to the ejection nozzle means;

ink and solvent flow sensor means for sensing a flow parameter of ink and a flow parameter of solvent through the ejection nozzle means, said ink and solvent flow sensor means being connected to the first and second electrodes; and control means responsive to the ink and solvent flow sensor means and operative to actuate the ink supply means and de-actuate the solvent supply means when the sensed ink flow parameter is above a first predetermined value and to actuate the solvent supply means and de-actuate the ink supply means when the sensed ink flow parameter is below the first predetermined value, and further operative to de-actuate the solvent supply means and re-actuate the ink supply means when the solvent flow parameter exceeds a second predetermined value.

2. The apparatus according to claim 1 in which the ink and solvent flow sensor means is operative to measure an electrical impedance between the first and second electrodes which constitutes the ink flow parameter, and to further measure an electrical impedance between the first and second electrodes which constitutes the solvent flow parameter.

3. The apparatus according to claim 1 in which the control means comprises ink flow gating signal generator means and solvent flow gating signal generator means, the ink and solvent flow sensor means being operative to sense the ink flow parameter only in response to the ink flow gating signal and further operative to sense the solvent flow parameter only in response to the solvent flow gating signal.

4. The apparatus according to claim 3, in which the solvent flow gating signal generator means is operative to generate the solvent flow gating signal only when the sensed ink flow parameter is below the first predetermined value.

5. The apparatus according to claim 4, in which the control means is operative to de-actuate both the ink supply means and the solvent supply means after the ink flow gating signal generator means generates the ink flow gating signal when the sensed ink flow parameter is above the first predetermined value.

6. The apparatus according to claim 5, in which the control means is operative to de-actuate both the ink supply means and the solvent supply means after the solvent flow gating signal generator means generates the solvent flow gating signal when the solvent flow parameter is above the second predetermined value.

7. The apparatus according to claim 6, in which the ink flow gating signal generator means is operative to generate the ink flow gating signal at least once after the solvent gating signal generator means generates the solvent flow gating signal, the control means being operative to de-actuate both the ink supply means and the solvent supply means when the sensed ink flow parameter subsequently exceeds the first predetermined value.

8. The apparatus according to claim 7, in which the solvent flow gating generator means is operative to generate the solvent flow gating signal at least once, the ink flow gating signal generator means being operative to subsequently generate the ink flow gating signal at least once only after the sensed solvent flow parameter exceeds the second predetermined value.

9. The apparatus according to claim 8, in which the control means is operative to de-energize both the ink supply means and the solvent supply means and provide an indication when the solvent flow gating signal generator means generates the solvent flow gating signal a predetermined number of times and the solvent flow rate remains below the second predetermined value.

* * * * *